Sept. 20, 1971  C. B. HORSLEY  3,606,263

FORCE DISTRIBUTING STRUCTURE

Filed Oct. 8, 1969  7 Sheets-Sheet 1

Sept. 20, 1971 C. B. HORSLEY 3,606,263
FORCE DISTRIBUTING STRUCTURE
Filed Oct. 8, 1969 7 Sheets-Sheet 4

United States Patent Office
3,606,263
Patented Sept. 20, 1971

3,606,263
FORCE DISTRIBUTING STRUCTURE
Caperton B. Horsley, East Walpole, Mass., assignor to Braxton Corporation, Medfield, Mass.
Filed Oct. 8, 1969, Ser. No. 864,751
Int. Cl. B01f *11/02*
U.S. Cl. 259—1                                                     14 Claims

ABSTRACT OF THE DISCLOSURE

A force distributing structure comprising: a distribution cone having an apical portion for receiving a concentrated axial force applied interior to the distribution cone and a basal edge; a first truncated cone, having a truncated edge and a basal edge, concentric with and opening in the opposite direction from the distributing cone and having its truncated edge attached to the basal edge of the distribution cone; structure providing an extended surface to which the axial force is distributed which is of greater area than the cross sectional area of the apical portion, the surface being supported by the basal edge of the first truncated cone; and, a second truncated cone, having a truncated and a basal edge, concentric with and opening in the same direction as the distribution cone and having its truncated edge attached to and supporting the surface.

---

This invention relates to force transmission and distribution.

A primary object of the invention is to provide a lightweight, rigid structure for transmitting forces between two force transmitting structures having different force-transmitting areas.

Another object is to provide such a structure that is sufficiently strong to withstand high levels of vibrational stresss.

Another object is to distribute a force from a first structure to a closely adjacent downstream structure of considerably greater area.

Another object is to transmit power efficiently from an oscillating system to a resonant acoustic chamber used for agglomerating particles.

Another object is to transmit acoustic power to an agglomeration chamber without allowing excessive leakage from the chamber.

The invention features a force distributing structure comprising: a distribution cone having an apical portion for receiving a concentrated axial force applied interior to the distribution cone and a basal edge; a first truncated cone, having a truncated edge and a basal edge, concentric with and opening in the opposite direction from the distribution cone and having its truncated edge attached to the basal edge of the distribution cone; structure, providing an extended surface to which the axial force is distributed which is of greater area than the cross sectional area of the apical portion, the surface being supported by the basal edge of the first truncated cone; and, a second truncated cone, having a truncated and a basal edge, concentric with and opening in the same direction as the distribution cone and having its truncated edge attached to and supporting the surface.

In preferred embodiments, there are featured a plurality of truncated cones and a cylindrical member, each pierced to provide gas passage and each having two edges, one edge attached by a weld to a corresponding annular ridge extending from an annular junction member at an angle to effectively form an extension of each truncated cone or cylindrical member and having a thickness substantially equal to the thickness of the truncated cone or cylindrical member attached thereto. The truncated cones and the cylindrical member support a gas-moving surface having a dished circular central portion and a multiplicity of dished annular outer portions. The structure is used in apparatus for generating a sound field comprising a support, an elongated elastic column constructed to maintain its structural integrity when subjected to vibrational stresses, constraint structure constraining the column against transverse motion relative to the support while permitting longitudinal motion of portions of the column, an electromagnetic motor arranged to provide periodic longitudinal forces acting on an end of the column, the period of these forces being equal to the period of the longitudinal vibrational mode of the column, and a control system for controlling the amplitude of longitudinal motion of the column. The structure is affixed to an end of the elastic column with the gas moving surface coextensive with an orifice in an acoustic resonant chamber. The structure includes a cylindrical lip extending from the gas moving surface and fitting movably with close tolerance within the orifice in the acoustic resonant chamber thereby providing a gas seal.

Other objects, features, and advantages will appear from the following description of a preferred embodiment of the invention, taken together with the attached drawings thereof, in which.

Figure 1:
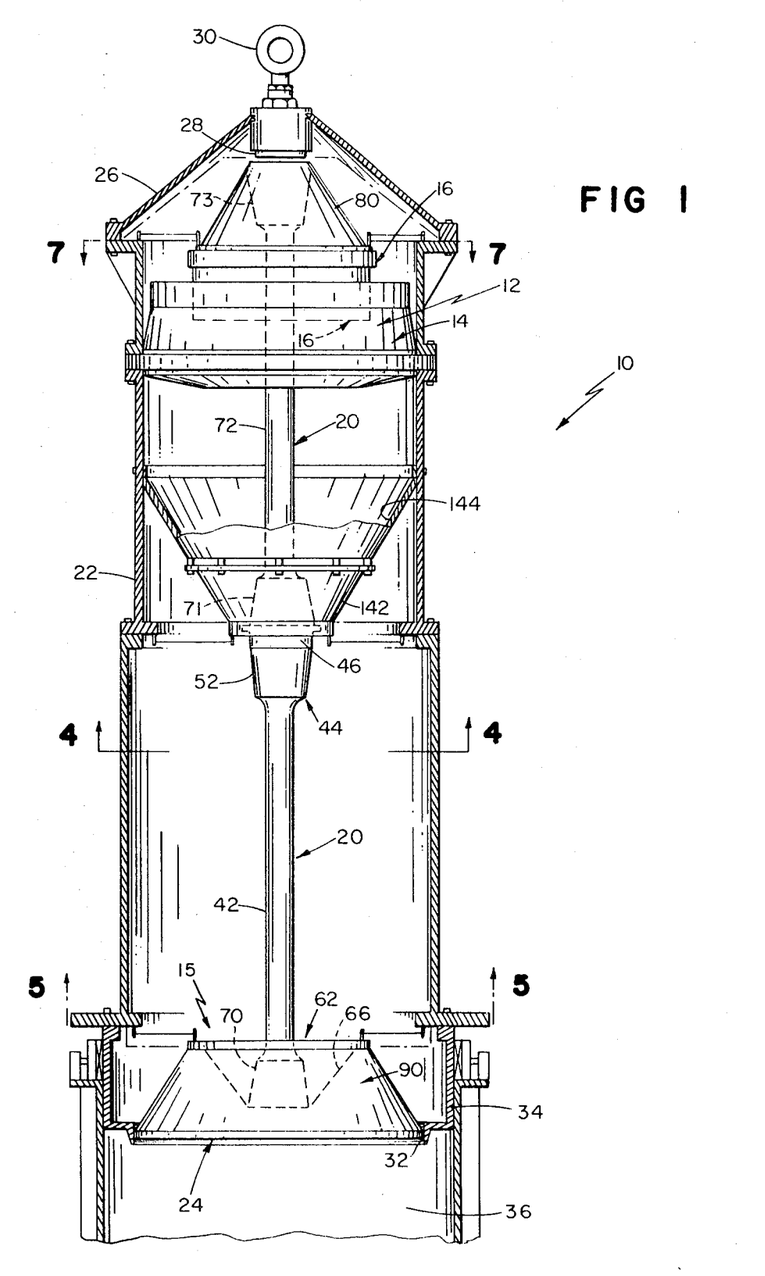
FIG. 1 is a partly schematic view of a preferred embodiment of the present invention, and portions of the housing covering the force distributing structure removed.

FIG. 1 shows schematically an acoustic stimulator 10 including an oscillating assembly 20 supported, by means discussed hereinafter, along the axis of cylindrical housing 22, a motor 12 including a magnet assembly 14 secured to housing 22 and an armature 16 fastened to the upper end of oscillating assembly 20, and a force distributing structure 15, comprising a distribution cone 66 and a piston assembly 90, fastened to the lower end of oscillating assembly 20 and having an extended surface 24 forming the upper wall of acoustic chamber 36. Housing cap 26 is bolted to the upper end of housing 22 and has affixed a support ring 30 and lock 28, providing means for immobilizing the oscillating assembly 20 during shipment.

Figure 3:
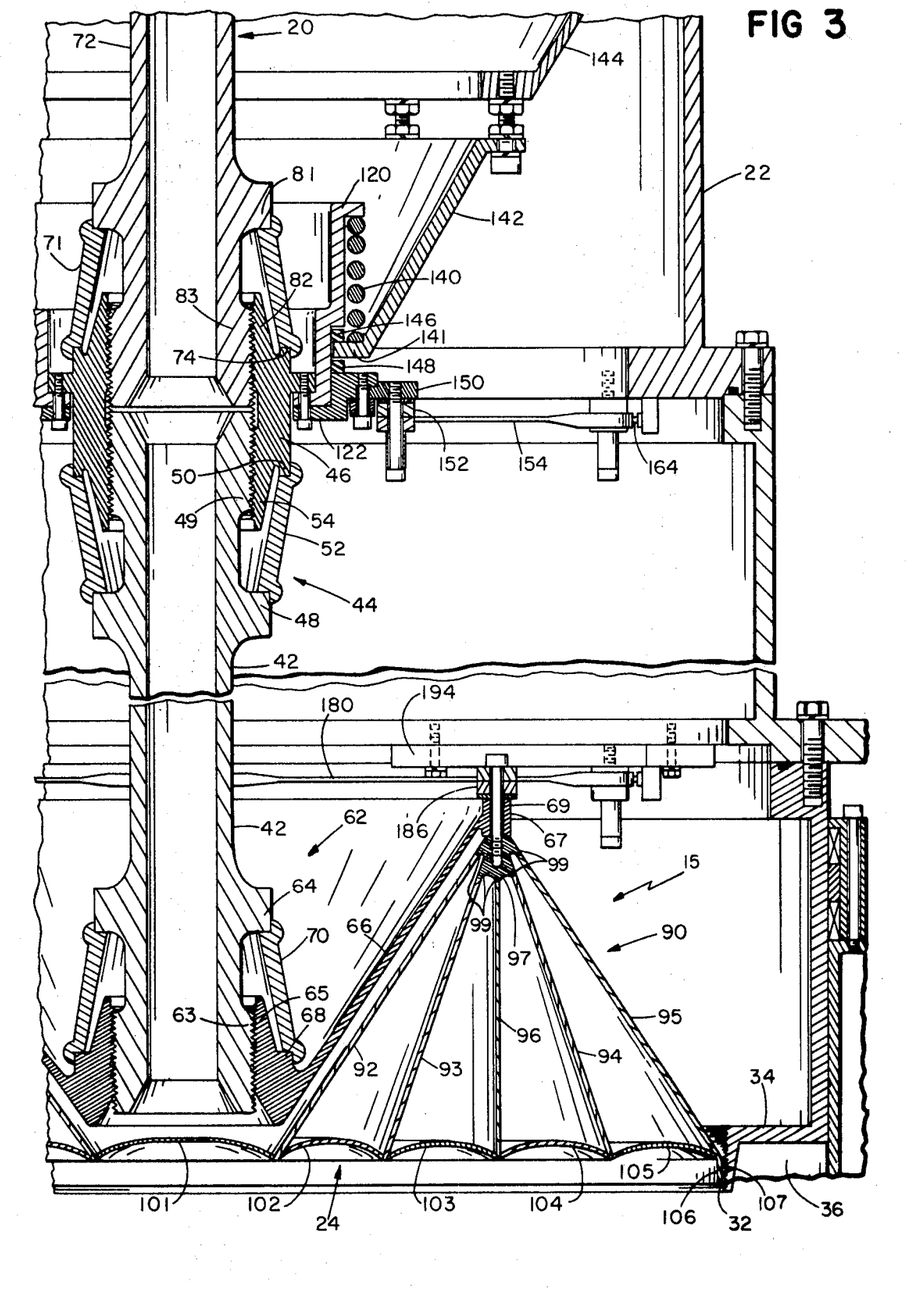
FIG. 3 is a longitudinal sectional view of the central and lower portions of the device showing particularly the force distributing structure and the central support.

Referring to FIG. 1 and FIG. 3, oscillating assembly 20 consists of two identical spring tubes 42, 72; identical distribution cone 66 and driver cone 80; four identical frusto-conical compression collars 70, 52, 71, 73; and spring tube coupling 46. As shown particularly in FIG. 3, lower spring tube 42, having the general form of a hollow cylinder, carries integrally on its proximal end 44 a flange 48 and an externally threaded portion 49. Spring tube coupling 46 carries integrally a shoulder 50 and a tapered, internally threaded lower portion 54 and is situated so that a number of threads of portion 54 extend distally beyond shoulder 50. Threaded portion 49 of lower spring tube 42 is threaded into lower portion 54 of coupling 46 with threads of portion 49 extending proximally beyond the engaged threads and threads of portion 54 extending distally beyond the engaged threads. Compression collar 52 is compressed longitudinally between flange 48 and shoulder 50 during assembly to a degree such that the static tensile stresses in threaded portion 49 and threaded portion 54 exceed in magnitude the transitory stresses produced in said portions during oscillation. The distal end 62 of lower spring tube 42 similarly carries a flange 64 and an externally threaded portion 63. Distribution cone 66, having the general form of a truncated cone, has a tapered internally threaded hub 65 and a shoulder 68, and is so situated that a number of threads of the hub 65 extend proximally beyond shoulder 68. Hub 65 is screwed onto threaded portion 63 with threads of hub 65 extending proximally beyond the engaged threads and threads of threaded portion 63 extending distally beyond the engaged threads. Compression collar 70 is compressed between flange 64 and shoulder 68. Distribution cone 66 has at its periphery an integral attachment ring 67 with 48 mounting holes 69 disposed equally around its circumference.

Upper spring tube 72 is identical to lower spring tube 42 and collar 71 is compressed between flange 81 and shoulder 74 of spring tube coupling 46, with threads of the upper threaded portion 82 of spring tube coupling 46 and threads of the lower threaded portion 83 of upper spring tube 72 extending respectively proximally and distally beyond the engaged threads. Driver cone 80 (FIG. 2) is identical to distribution cone 66 and collar 73 is compressed between flange 84 and shoulder 85 of upper spring tube 72, with threads of threaded tube portion 86 extending proximally beyond the engaged threads and threads of threaded cone portion 88 extending distally beyond the engaged threads. All of collars 70, 71, and 73 are compressed such that static tensile stresses in the corresponding threaded portions will exceed in magnitude transitory stresses produced during oscillation.

Oscillating assembly 20 is made of stainless steel (e.g., E 4340 Aircraft Quality Steel). The mass of motor armature 16 is equal to the mass of piston assembly 90 which has a mass of about 60 lb. Spring tubes 42, 72 have central transverse cross sectional areas of 3 sq. in., and the resonant period of oscillating assembly 20 in its longitudinal vibrational mode is about 1/400 sec. The oscillating assembly is bilaterally symmetric about a transverse plane extending approximately across the junction of spring tubes 42 and 72, and is rotationally symmetric about its central longitudinal axis.

Figure 4:
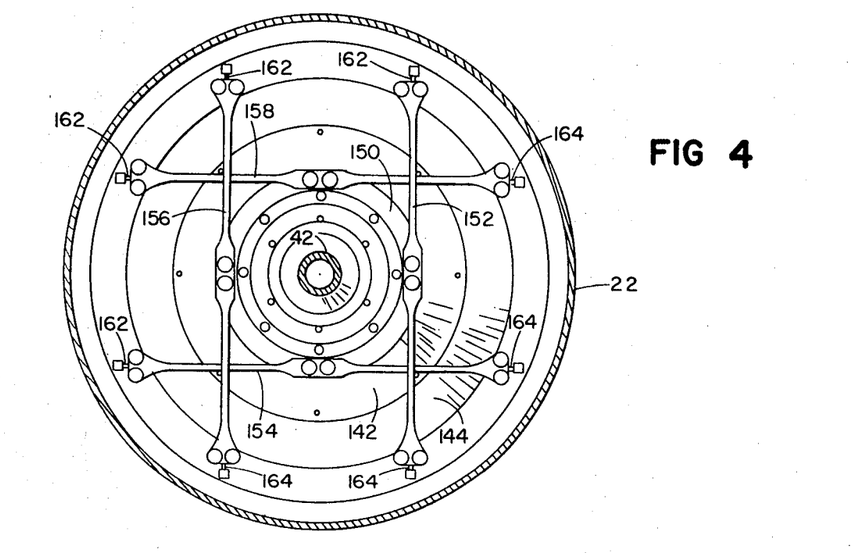
FIG. 4 is transverse section (at line 4—4 of FIG. 1) showing the central constraint structure.
Figure 5:
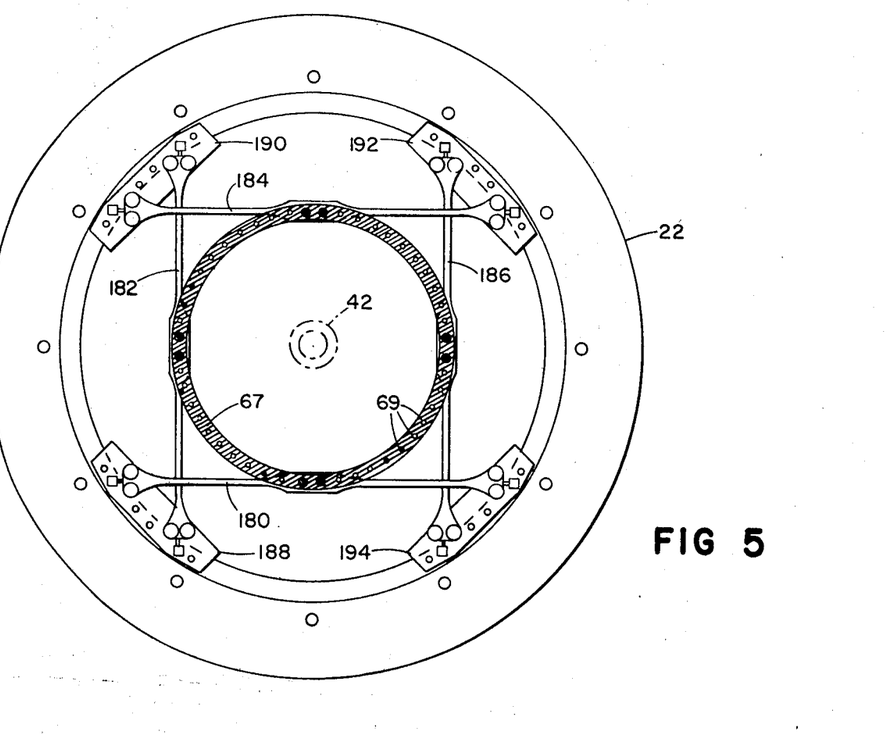
FIG. 5 is a transverse cross section (at line 5—5 of FIG. 1) showing the lower constraint structure.

Bolted to spring tube coupling 46 is annular support bracket 120 and stepped mounting ring 122. Oscillating assembly 20 is supported on support bracket 120 resting on helical support spring 140, which is in turn supported by an apical portion 141 of a conical bracket 142 bolted to extension 144 of housing 22. Two high durometer rubber bumper rings 146, 148 encircling support bracket 120 above and beneath bracket portion 141 prevent excessive flexing of support spring 140. Adjustment ring 150 is clamped onto mounting ring 122. As shown particularly in FIG. 4, the transverse position of oscillating assembly 20 is maintained by four flexible positioning straps 152, 154, 156, 158 bolted centrally to adjustment ring 150 and peripherally to housing 22. The lengthwise position as well as the tension of positioning strap 152 is adjustable during assembly by adjustment screw 162 at one end and adjustment screw 164 at the other end. Positioning straps 154, 156, and 158 are similarly adjustable. As shown particularly in FIG. 5, the transverse position of distribution cone 66 is maintained by flexible positioning straps 180, 182, 184, 186 bolted centrally to attachment ring 67 and peripherally to brackets 188, 190, 192, 194 which are supported on housing 22. The lengthwise position and tension of positioning straps 180, 182, 184, 186 are adjustable in the same way as the lengthwise position and tension of strap 152.

Figures 6, 7:
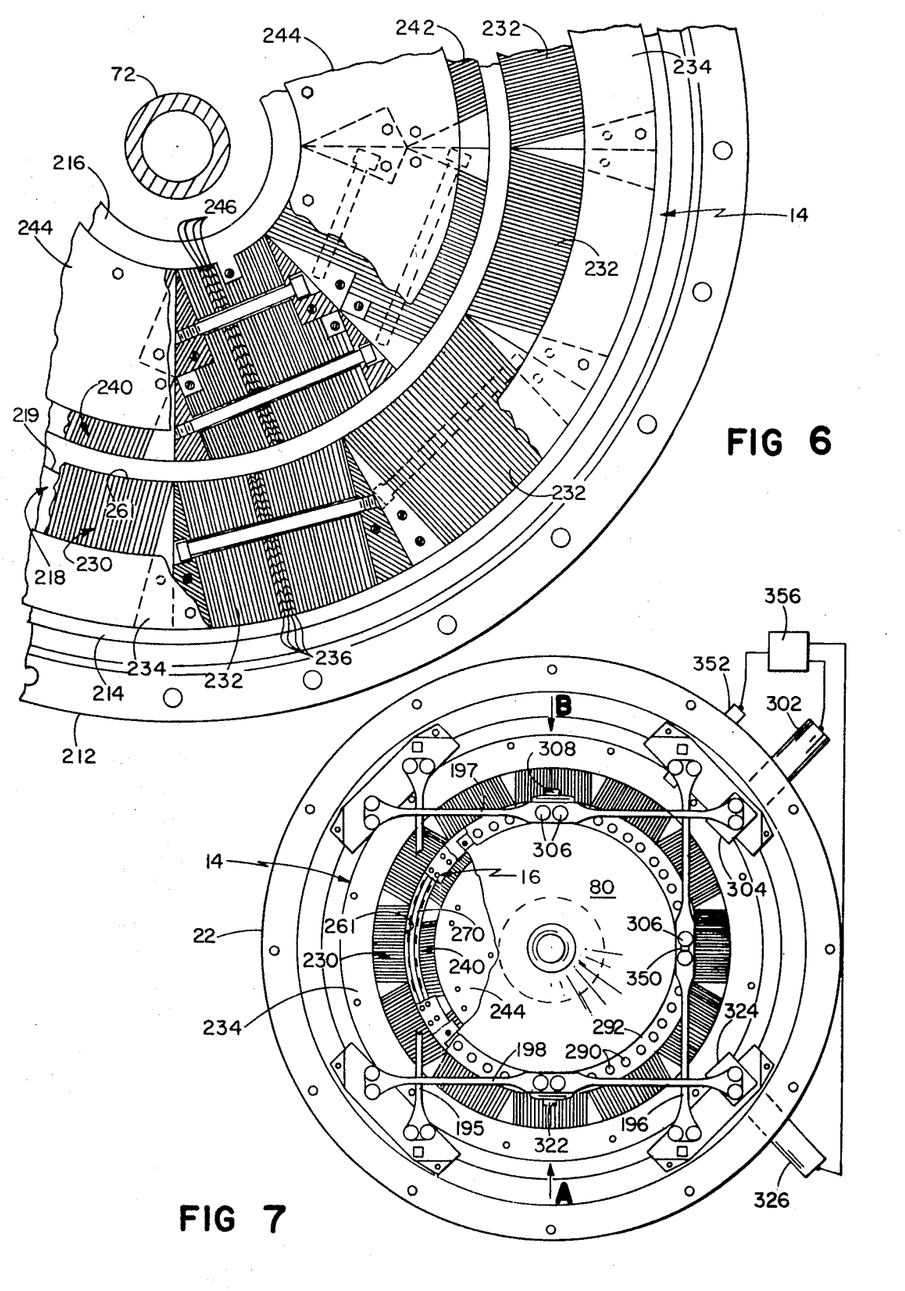
FIG. 6 is a transverse view of the magnet with portions cut away.
FIG. 7 is a transverse view of the device with the top removed and portions cut away to reveal the motor.
Figures 8, 9:
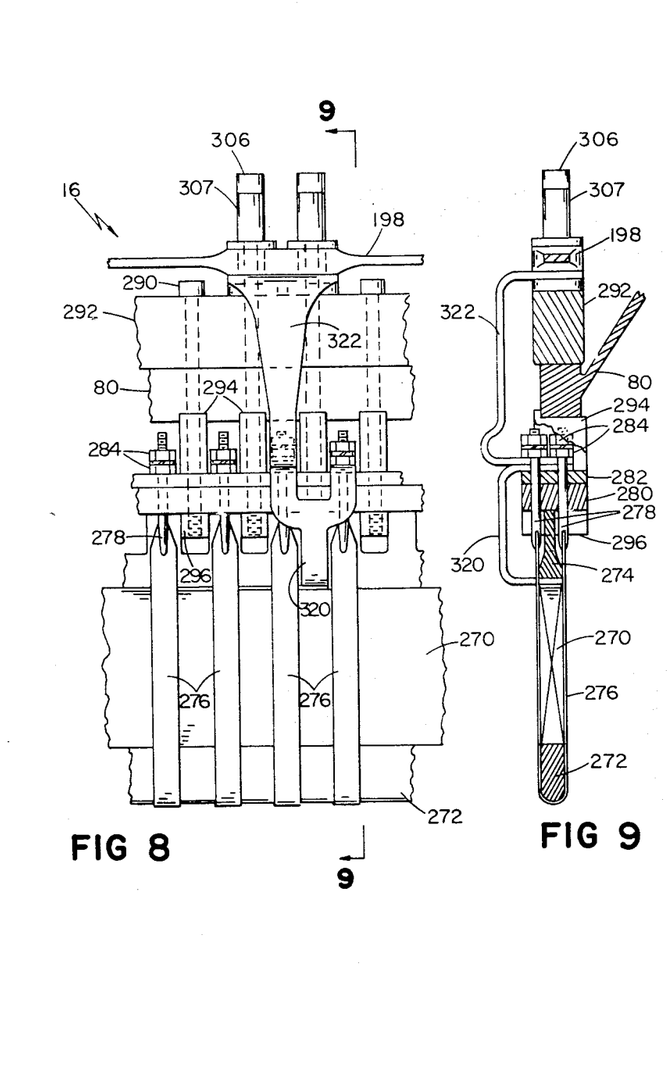
FIG. 8 is a view (from direction A in FIG. 7) of a portion of the motor armature removed from the device.
FIG. 9 is a cross sectional view of the armature along line 9—9 of FIG. 8 with a portion broken away.
Figures 10, 11:
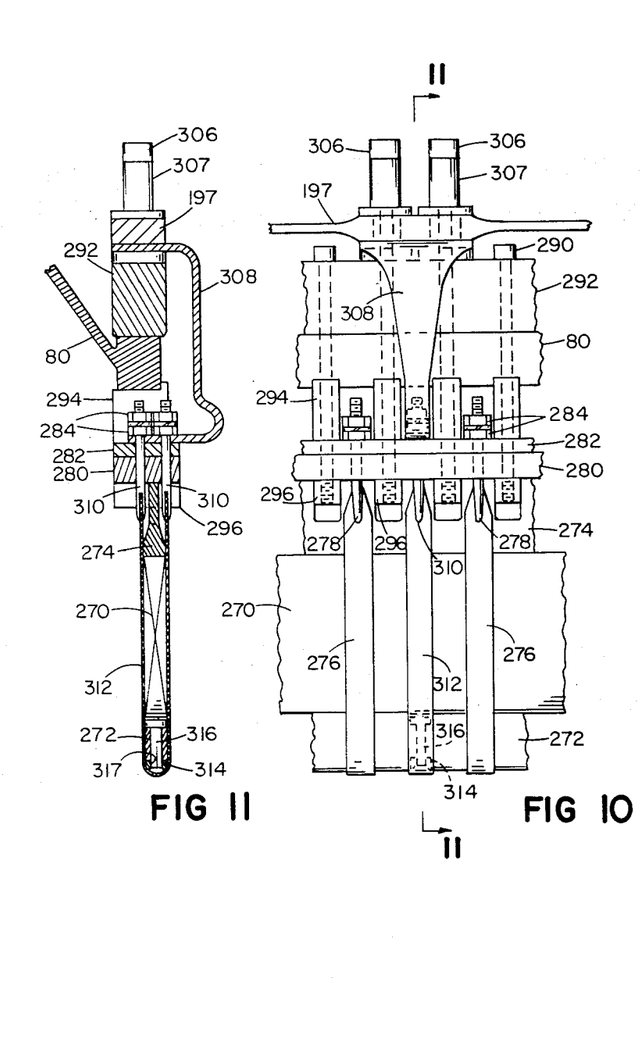
FIG. 10 is another view (from direction B in FIG. 7) of the motor armature removed from the device.
FIG. 11 is a cross sectional view of the armature along line 11—11 of FIG. 10.

As shown particularly in FIG. 7, the transverse position of driver cone 80 is maintained by positioning straps 195, 196, 197, 198 bolted centrally to driver cone 80 and peripherally to housing 22. Straps 197, 198 are made of material both strong and of good electrical conductivity such as copper-beryllium, and are isolated electrically from driver cone 80 and from housing 22. Straps 152, 154, 156, 158, 180, 182, 184, 186, 195, and 196 are made, e.g. of stainless steel.

Figure 12:
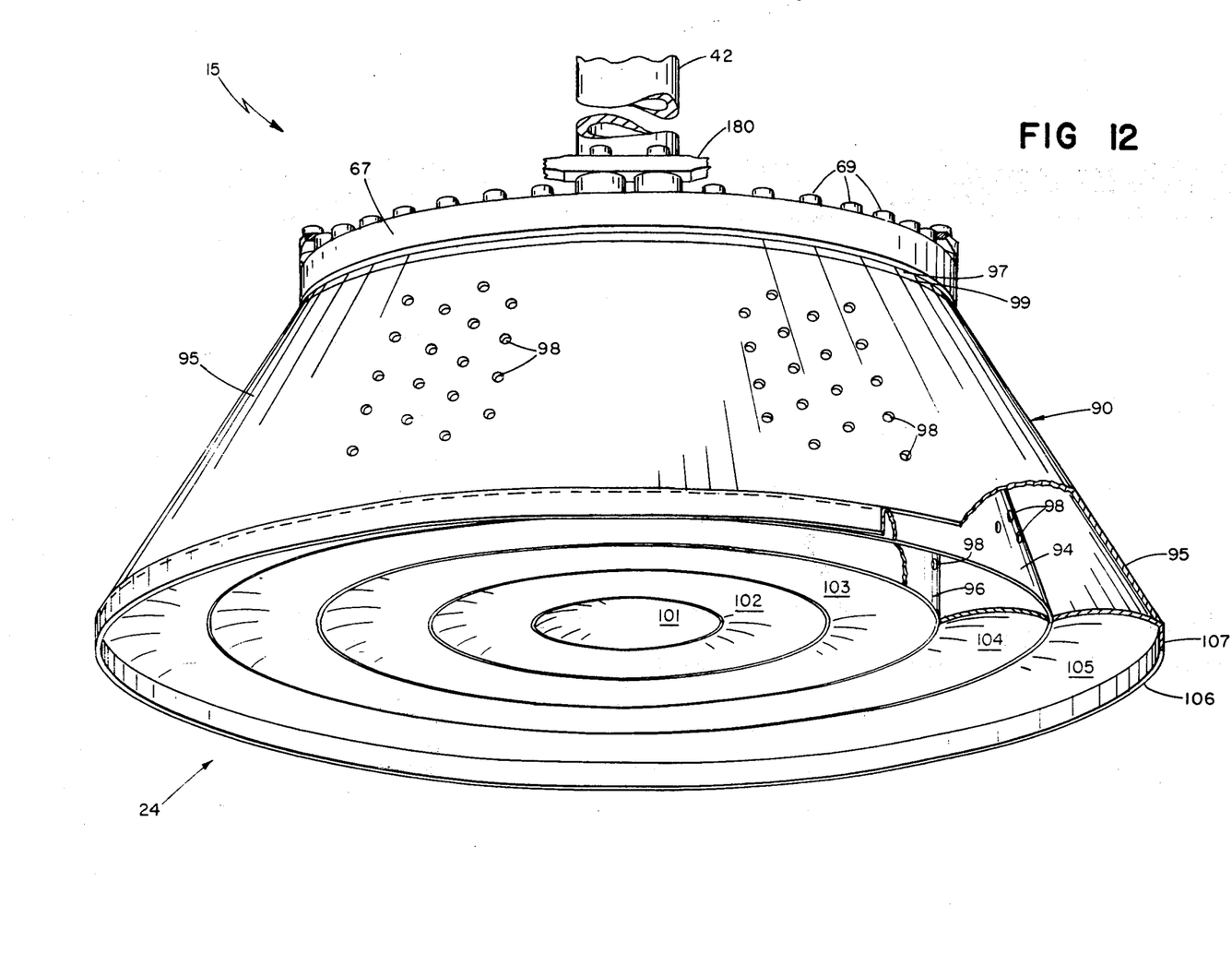
FIG. 12 is a perspective view with portions cut away of the structure transmitting the force from the end of the elastic column to the gas interacting surface.

As shown particularly in FIG. 3 and FIG. 12 bolted to attachment ring 67 is piston assembly 90 consisting of four thin truncated cones 92, 93, 94, 95, first truncated cone 95 opening in the opposite direction to distribution cone 66, second truncated cone 92, opening in the same direction as distribution cone 66, and cones 93, 94 being intermediate of cones 92 and 95, and a thin cylindrical member 96. All of cones 92, 93, 94, and 95, and cylindrical member 96 are attached to annular junction member 97. Five face pieces 101, 102, 103, 104, 105 are shaped to avoid buckling, and form extended gas-moving surface 24, supported by the basal edge of cone 95. Cones 92, 93, 94, 95, 96 are each pierced by 72 holes 98 distributed in four groups around the surface providing channels for passage of gas. Annular junction 97 is secured through attachment ring 67 to the basal edge of distribution cone 66 and has protruding annular attachment ridges 99 running circumferentially and having a thickness equal to the thickness of cones 92, 93, 94, 95, and cylindrical member 96 which are welded to ridges 99. Circular face piece 101 has the general shape of a shallow dish and is affixed to and spans the interior of cone 92. Dished annular face piece 102 is attached to and spans the interval between cones 92 and 93. Dished annular face piece 103 is attached to and spans the interval between cone 93 and cylindrical member 96. Dished annular face piece 104 is attached to and spans the interval between cylindrical member 96 and cone 94. Face piece 105 has the general shape of a dished annulus and carries in addition a forward protruding lip 106 (.57 in. long). Face piece 105 is affixed to and spans the interval between cones 94 and 95. The outer cylindrical surface 107 (30 inch diameter in preferred embodiment) of face piece 105 fits snugly but movably (e.g., .030 to .040 in. clearance) in orifice 32 of housing portion 34. In the preferred embodiment, cones 92, 93, 94, 95, cylindrical member 96, and face pieces 101, 102, 103, 104, 105 are formed from .06 inch stock of 21–6–9 stainless steel having carbon less than .04%. The diameters of cones 92, 93, 94, 95, and cylinder 96 where they meet surface 24 are respectively 5.1 in., 11.3 in., 23.7 in., 29.9 in., and 17.4 in. Surface 24 is supported at a distance less than 1 in. in front of the end of spring tube 42.

Figure 2:
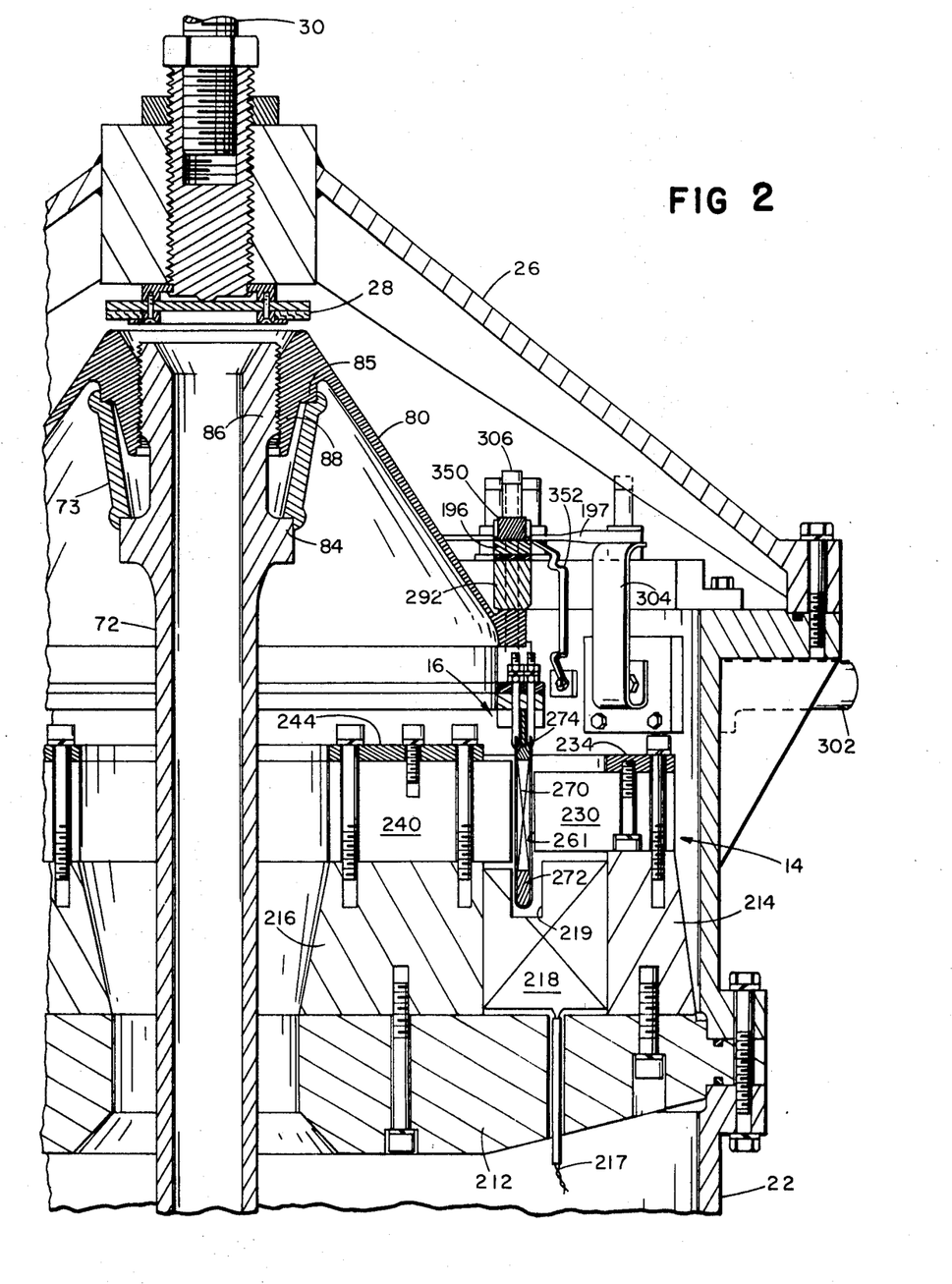
FIG. 2 is a longitudinal sectional view of the upper portion of the apparatus of FIG. 1 showing particularly the motor.

Motor magnet 14, shown particularly in FIGS. 2 and 6, includes annular magnet base 212 bolted at its periphery to housing 22. Annular magnet outer ring 214 and annular magnet inner ring 216 are bolted concentrically to magnet base 212. Annular coil 218 fits in the space between magnet outer ring 214 and magnet inner ring 216. The winding of coil 218 runs tangentially and is connected to leads 217. Coil 218 contains an annular slot 219. Outer annular pole piece 230 is bolted to magnet outer ring 214, and inner annular pole piece 240 is bolted to magnet inner ring 216 leaving an annular gap 261 between inner pole 240 and outer pole 230. Outer pole 230 consists of 12 segments 232 bolted to outer retainer 234. Each of the segments 232 is made up of lamina 236 bolted together and electrically insulated from one another with the short dimension of the lamina running approximately circumferential to the axis of motor magnet 14. Inner pole 240 is made up of eight segments 242 bolted to inner retainer 244 to form a generally annular structure. Each segment 242 is made up of lamina 246 bolted together with the short dimension of the lamina 246 running approximately circumferential to the axis of motor magnet 14. The lamina prevent interfering circumferential fields from being formed because of current flow in armature 16. Motor armature 16 supported by driver cone 80 fits with clearance within the gap 261 between outer pole 230 and inner pole 240 with its end protruding into the slot in coil 218. Magnet base 212, magnet outer ring 214, magnet inner ring 216, lamina 236 and 246 are made of ferromagnetic material suitable for conducting magnetic flux.

Referring to FIGS. 2, 8, 9, 10, and 11, armature 16 includes coil 270 circumferentially wound around an axis and clamped between ring shaped bottom insulator 272 and top insulator 274 by binding webs 276 distributed at equal intervals around armature 16. Each binding web 276 is attached (e.g., by silver soldering) to two pins 278 which pass through insulating ring 280 and insulating ring 282. All binding webs 276 and pins 278 are made of stanless steel except for connecting web 312 and associated pins 310 which are used for electrical connections and are made, e.g., of copper beryllium. Pins 278 are drawn up by nuts 284 bearing on ring 282. Armature 16 is bolted to driver cone 80 by bolts 290 passing through counter weight 292, driver piston 80, spacers 294, insulator ring 282, and insulator ring 280 into nuts 296. Electrical connections for coil 270 are made from terminal 302 to connector 304, to which is bolted strap 197 made of copper beryllium alloy which is bolted by insulated bolts 306 to armature 16. Clamped beneath and making electrical contact with strap 197 is one end of connector 308 which is clamped at its other end in contact with electrical conducting pins 310 made of copper-beryllium and affixed to connecting web 312 made of copper-beryllium. Web 312 makes electrical contact through connecting member 314 and spool-shaped member 316, which is snugly secured in aperture 317 of member 314, to the lower end of coil 270. The upper end of coil 270 communicates electrically with connector 320 made of copper beryllium which is in turn clamped in electrical contact with connector 322, again made of, e.g., copper-beryllium. An end of connector 322 is clamped between insulator ring 292 and strap 198 making electrical contact with strap 198. Strap 198 is bolted peripherally to and makes contact with connector 324 (affixed to but insulated from housing 22) which is connected to terminal 326 (FIG. 7). Terminals 302, 326 are connected to the output of current source 356 (shown schematically), which uses conventional circuitry to provide an alternating current of controllable amplitude at a frequency controllable in a range including the resonant frequency of oscillating assembly 20. Amplitude control is achieved, e.g., by a conventional accelerometer 350 affixed to the central part of strap 196. The output of accelerometer 350 is conducted electrically through (copper-beryllium) strap 196 (which is insulated from armature 16 and from housing 22) thence to terminal 352 (attached to but insulated from housing 22), thence to a control input of current source 356. Bolts 306 and similar bolts used elsewhere on oscillating assembly 20 are preferably long shanked and tightened against collars 307 to produce significant elastic deformation (typically .003 to .009 inch) in shank.

In operation motor magnet 14 is energized by connecting leads 217 to a source of DC electric current, thereby producing a magnetic flux following a path through magnet base 212, magnet outer ring 214, outer pole 230, radially across gap 261 in which is situated armature 16, through inner pole 240 and magnet inner ring 216 back to magnet base 212. A magnetic flux radial in coil 270 of armature 16 is thus produced (in preferred embodiments, the field in this gap is 10,000 gauss).

The tangentially flowing AC current in armature coil 270 interacts with the radial magnetic flux in gap 261 between outer pole 230 and inner pole 240 to produce a reciprocating longitudinal force on coil 270. The reciprocating force is in turn transmitted to armature 16 and thence to driver cone 80 at the upper end of oscillating assembly 20. The frequency of the AC electrical source supplying armature 16 is adjusted to correspond to the fundamental resonant longitudinal vibration frequency of oscillating assembly 20 (about 400 Hz., in the preferred embodiment), and when this adjustment has been made, a standing longitudinal vibration is set up in oscillating assembly 20, with a velocity minimum occurring at or oscillating assembly on either side of its transverse median plane and because of the equal masses of the piston assembly 90 bolted to the lower end of oscillating assembly 20 and of armature 16 bolted to the upper end of oscillating assembly 20, this standing vibration will be symmetrical about the median transverse plane of oscillating assembly 20, with a velocity minimum occuring at or near the median plane and a velocity maximum occurring at the upper and lower extremities of oscillating assembly 20. Support bracket 120 being situated near a velocity minimum point will give a minimum of interference with the oscillations of oscillating assembly 20, while armature 16 and piston assembly 90, being situated near points of maximum velocity, will have a strong interaction with respectively the magnetic field of magnet 14 and acoustic chamber 36. An oscillating force is applied by spring tube 42 to the central portion of distribution cone 66 which transmits the force to junction member 97 from which it is transmitted through cones 92, 93, 94, 95, and cylinder 96 to face pieces 101, 102, 103, 104, 105 which as parts of surface 24 deliver acoustic energy to chamber 36. Lip 106 moves in proximity to orifice 32 to provide a gas seal between chamber 36 and the interior of housing 22.

When the amplitude of the oscillations of oscillating assembly 20 is low, accelerometer 350 senses this fact and acting through current source 356 causes the maximum design current to be supplied to coil 270. With maximum current in coil 270, the reciprocating forces produced feed oscillatory power into oscillating assembly 20 in excess of the power drained from assembly 20 by losses and by interaction of piston assembly 90 with the contiguous gas. The amplitude of oscillation in assembly 20 will therefore increase. As the amplitude increases both the power fed into and the power drained from assembly 20 will increase (because of the increased motion of the armature 16 and the piston assembly 90), but the power fed will continue to exceed the power drained, and the amplitude will continue to increase to values many times greater than the armature forces could produce in a non-resonant structure. When the amplitude rises to the design limit (in the preferred embodiment, acceleration of 800 g. and excursion of .050 inch), accelerometer 350, sensing this condition, causes current source 356 to reduce the current supplied to coil 270 approximately to limit the amplitude to the design value. The reduced current required to maintain the design value of amplitude will vary depending on conditions in acoustic chamber 36, the accuracy with which the electrical supply frequency matches the resonant frequency of oscillating assembly 20 and other factors.

Operating at design values, acoustic stimulator 10 may be utilized to produce a sonic field having up to about 1.3 p.s.i. peak pressure in closed acoustic chamber 36. The alternating gas velocity of this sonic field causes differential movement of small (say 3 micron diameter) and large (say 50 micron diameter) particles suspended in the gas filling chamber 36. The smaller particles therefore are caused to collide and coalesce with larger particles and thereby become more readily removable from suspension.

Other embodiments will occur to those skilled in the art.

What is claimed is:

1. A force distributing structure comprising:
   a distribution cone having an apical portion for receiving a concentrated axial force applied interior to said distribution cone and a basal edge;
   a first truncated cone, having a truncated edge and a basal edge concentric with and opening in the opposite direction from said distribution cone and having its truncated edge attached to said basal edge of said distribution cone;
   structure providing an extended surface to which said axial force is distributed which is of greater area than the cross sectional area of said apical portion, said extended surface being supported by said basal edge of said first truncated cone; and
   a second truncated cone having a truncated edge and a basal edge, concentric with and opening in the same direction as said distribution cone and having its truncated edge attached to and supporting said surface.

2. The force distributing structure of claim 1 in which said surface is a gas-moving surface and comprises a dished circular central portion and at least one dished annular outer portion.

3. The force distributing structure of claim 2 in which said gas-moving surface is coextensive with an orifice in an acoustic resonant chamber.

4. The force distributing structure of claim 3 including a cylindrical lip extending from said surface and fitting movably, but with close tolerance, within said orifice.

5. The force distributing structure of claim 3 in which said axial force is provided by a mechanism adapted for oscillation along the axis of said distribution cone.

6. The force distributing structure of claim 3 in which each said truncated cone is pierced to thereby provide gas passages.

7. The force distributing structure of claim 3 wherein there are also provided a plurality of additional truncated cones each having a truncated edge and a basal edge, each said additional cone having one of said edges attached to said attachment ring and the other of said edges attached to and supporting said gas-moving surface.

8. A force distributing structure of claim 7 wherein there is also provided a cylindrical member attached to and disposed between said attachment ring and said gas-moving surface.

9. The force distributing structure of claim 1 including an annular junction member affixed to said basal edge of said distribution cone to which said truncated edge of said first truncated cone and said basal edge of said second truncated cone are attached.

10. The force distributing structure of claim 9 wherein said annular junction member includes annular attachment ridges to which said truncated edge of said first truncated cone and said basal edge of said second truncated cone are attached each said annular ridge extending from said annular junction member at such an angle so as to effectively form an extension of each of said truncated cones.

11. The force distributing structure of claim 10 wherein the thickness of each said annular ridge is substantially equal to the thickness of the truncated cone attached thereto.

12. The force distributing structure of claim 11 wherein said truncated cones are attached to said annular ridges by means of welds.

13. In apparatus for generating a sound field comprising a support, an elongated elastic column constructed to maintain its structural integrity when subjected to vibrational stresses, constraint structure constraining said column against transverse motion relative to the support while permitting longitudinal motion of portions of the column, an electromagnetic motor arranged to provide periodic longitudinal forces acting on an end of the column, the period of these forces being equal to the period of the longitudinal resonant vibrational mode of the column, a control system for controlling the amplitude of longitudinal motion of said column and an extended gas-moving surface transverse to said column,
   a force distributing structure secured to said column said force distributing structure comprising
   a distribution cone having an apical portion for receiving a concentrated axial force applied interior to said distribution cone and a basal edge;
   a first truncated cone having a truncated edge and a basal edge, concentric with and opening in the opposite direction from said distribution cone and having its truncated edge attached to said basal edge of said distribution cone;
   structure providing said extended surface to which said axial force is distributed which is of greater area than the cross sectional area of said apical portion, said extended surface being supported by said basal edge of said first truncated cone; and
   a second truncated cone, having a truncated edge and a basal edge, concentric with and opening in the same direction as said distribution cone and having its truncated edge attached to and supporting said surface.

14. The force distributing structure of claim 13 wherein said sound field is generated into an acoustic resonant chamber and said gas-moving surface is coextensive with an orifice in said chamber.

References Cited

UNITED STATES PATENTS

| | | | |
|---|---|---|---|
| 3,176,964 | 4/1965 | Cottell | 259—1R |
| 3,285,579 | 11/1966 | Guerin | 259—1R |
| 3,495,807 | 2/1970 | Shields | 259—1R |

ROBERT W. JENKINS, Primary Examiner

U.S. Cl. X.R.

259—72